US007322530B2

(12) United States Patent
Walter et al.

(10) Patent No.: US 7,322,530 B2
(45) Date of Patent: Jan. 29, 2008

(54) FORGERY-PROOF MARKING FOR OBJECTS AND METHOD FOR IDENTIFYING SUCH A MARKING

(75) Inventors: Harald Walter, Erlangen (DE); Georg Bauer, Nuremberg (DE); Ralph Domnick, Buckenhof (DE)

(73) Assignee: november Aktiengesellschaft Gesellschaft fur Molekulare Medizin, Erlangen (DE)

( * ) Notice: Subject to any disclaimer, the term of this patent is extended or adjusted under 35 U.S.C. 154(b) by 121 days.

(21) Appl. No.: 10/486,955

(22) PCT Filed: Aug. 14, 2002

(86) PCT No.: PCT/EP02/09124

§ 371 (c)(1), (2), (4) Date: Aug. 31, 2004

(87) PCT Pub. No.: WO03/016073

PCT Pub. Date: Feb. 27, 2003

(65) Prior Publication Data

US 2005/0001038 A1 Jan. 6, 2005

(30) Foreign Application Priority Data

Aug. 16, 2001 (DE) .................... PCT/DE 01/03205
Feb. 7, 2002 (DE) ................................ 102 05 152
Feb. 26, 2002 (DE) ................................ 102 08 036

(51) Int. Cl.
*G06K 19/06* (2006.01)

(52) U.S. Cl. ....................................... 235/491; 235/487

(58) Field of Classification Search ................ 235/491, 235/492, 487, 488
See application file for complete search history.

(56) References Cited

U.S. PATENT DOCUMENTS 4,662,653 A 5/1987 Greenaway
5,611,998 A 3/1997 Aussenegg et al.
6,659,355 B1 * 12/2003 Fischer et al. .............. 235/492
6,669,906 B1 * 12/2003 Schalkhammer et al. ..... 422/50
6,695,213 B2 * 2/2004 Curtis ........................ 235/491
6,841,238 B2 * 1/2005 Argoitia et al. ............. 428/323
6,908,035 B2 * 6/2005 Bench et al. ............... 235/491
7,044,396 B2 * 5/2006 Sankey et al. .............. 235/494
7,085,058 B2 * 8/2006 Heim ......................... 359/582
2002/0160194 A1 * 10/2002 Phillips et al. .............. 428/403
2005/0257270 A1 * 11/2005 Grassi et al. ................. 726/26
2006/0043200 A1 * 3/2006 Puschner et al. ........... 235/492

FOREIGN PATENT DOCUMENTS

WO WO 01/53113 7/2001

* cited by examiner

*Primary Examiner*—Thien M. Le
*Assistant Examiner*—Edwyn Labaze
(74) *Attorney, Agent, or Firm*—Fish & Richardson P.C.

(57) ABSTRACT

The invention relates to forgery-proof marking for objects, such as check cards, banknotes, labels, and the like, comprising a plastic transparent film (1) having a first and second surface, whereby a series of layers is applied to the second surface. When viewed from the first surface, the color of this series of layers changes according to the viewing angle, and the series of layers is formed from an absorber layer provided on the second surface, from a spacer layer (3) overlying the absorber layer, and from a mirror layer (2) overlying the spacer layer (3). In order to improve the machine identification of the authenticity of the marking, the invention provides that the absorber layer is comprised of metallic clusters (4).

8 Claims, 7 Drawing Sheets

FORGERY-PROOF MARKING FOR OBJECTS AND METHOD FOR IDENTIFYING SUCH A MARKING

CROSS-REFERENCE TO RELATED APPLICATIONS

Figure 1:
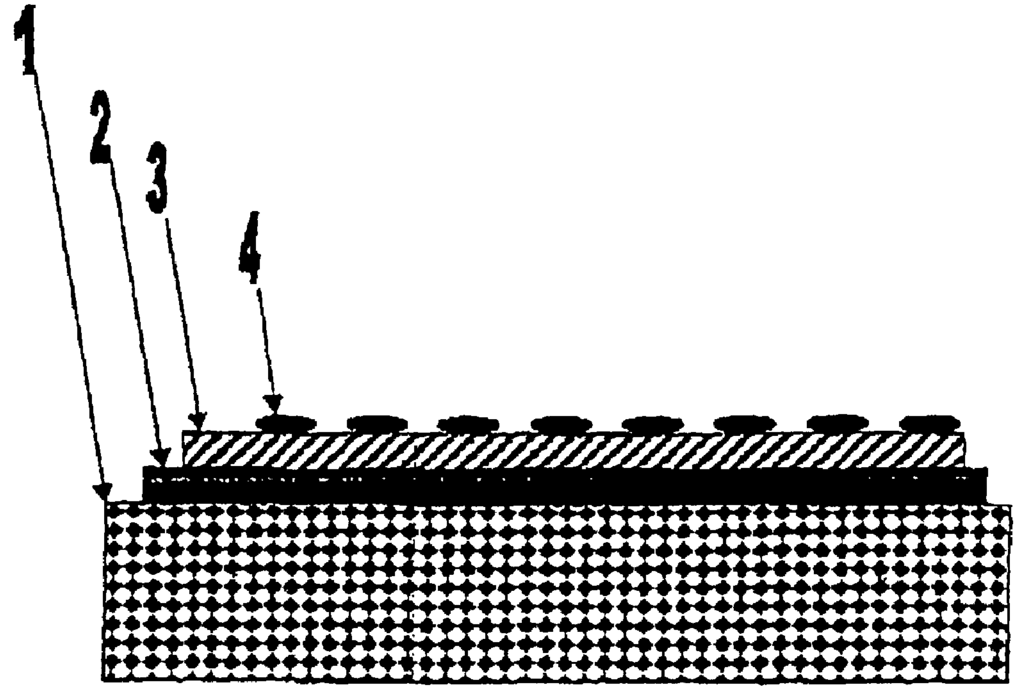

This application is a National Stage application under 35 U.S.C. §371 and claims benefit under 35 U.S.C. §119(a) of International Application No. PCT/EP02/09124 having an International Filing Date of Aug. 14, 2002, which claims the benefit of priority of DE 102 08 036.4 having a filing date of Feb. 26, 2002, DE 102 05 152.6 having a filed date of Feb. 7, 2002, and International Application No. PCT/DE01/03205 having an International Filing Date of Aug. 16, 2001.

The invention relates to a forgery-proof marking according to the preamble of claim 1. It also relates to a method for the machine identification of such a marking.

A similar marking is disclosed by WO 01/53113 A1. This essentially comprises the combination of a holographically structured film with a series of layers which appears in different colors, depending on the viewing angle. The series of layers comprises an absorber layer, a dielectric layer and a reflective layer. The layer thickness of the aforementioned layers is in each case in the nanometer range. The proposed forgery-proof marking is intended to be used in particular for the identification of banknotes, check cards and the like. In the case of such a use, it is required that the authenticity of the marking be verifiable securely and reliably by machine. The aforementioned marking does not meet this requirement.

It is an object of the invention to specify a forgery-proof marking and a method for identifying such a marking with which the disadvantages according to the prior art are eliminated. The intention is, in particular, to specify a forgery-proof marking whose authenticity can be verified securely and reliably by machine. A further aim of the invention is the specification of a method for identifying such a forgery-proof marking.

According to the invention, provision is made for the absorber layer to comprise metallic clusters. This advantageously achieves the situation where the authenticity of the marking can be verified by machine. The absorber layer formed of metallic clusters produces a highly characteristic absorption spectrum because of the unexpected variations of the refractive index and of the extinction against the wavelength. For example, specific peaks and/or peak shifts and/or peak forms caused by the metallic clusters can be measured. Furthermore, the metallic clusters, because of their extreme extinction coefficients, produce particularly high intensities of the peaks in the absorption spectrum as compared with the conventional unstructured absorber layers. In a conventional unstructured absorber layer, the absorption is only slightly dependent on the angle over wide angle ranges, as is known. When the structured absorber layer comprising metallic clusters according to the invention is used, it is found that this intrinsically exhibits a substantially more intense angle-dependent absorption. As a result, the absorption spectrum of the forgery-proof marking according to the invention changes in a manner which is unexpected and can be verified by machine when measured at different angles. The aforementioned properties of the forgery-proof marking permit secure and reliable machine verification of the authenticity.

It has proven to be expedient for the clusters to form discrete islands with a size of at most 100 nm, preferably 5 to 35 nm, in at least one spatial direction. The thickness of the, preferably dielectric, spacer layer is expediently chosen such that the absorption of visible light incident on the cluster layer is a maximum.

According to a further configuration feature, it has proven to be expedient for the series of layers to have, at a viewing angle of 45° in the wavelength range between 300 and 800 nm, an absorption with a maximum value of at least 60%, preferably 80%, particularly preferably 90%. This permits secure and reliable machine identification of the forgery-proof marking.

The clusters are expediently formed from one of the following metals: gold, silver, platinum, palladium, tin, aluminum, copper, indium.

According to a further refinement, the cluster layer can not only be joined firmly but also joined detachably to the spacer layer. It is also possible for the spacer layer not only to be joined firmly but also joined detachably to the mirror layer. The proposed configurations permit reversible separation of the series of layers. In the converse case, however, it is also possible to join the series of layers reversibly at the proposed separation surfaces. This makes it possible for the forgery-proof marking to be visible only when read out.

With regard to the spacer layer, it has proven to be expedient for this to have a thickness of 40 to 2000 nm. The spacer layer can be produced from one of the following materials: metal oxide, metal nitrite, metal oxynitrite, metal carbide, in particular from silicon oxide, silicon carbide, silicon nitrite, tin oxide, tin nitrite, aluminum oxide, aluminum nitrite or polymer, in particular polycarbonate (PC), polyethylene (PE), polypropylene (PP), polyurethane (PU), polyimide (PI), polystyrene (PS) or polymethacrylate (PMA), polyvinyl alcohol (PVA), polyacrylates (PA), nitrocellulose (NC), polyethylene terephthalate (PET).

According to a further refinement, the film has a layer thickness of 5 to 100 μm. It can be produced from polyethylene terephthalate. According to a particularly advantageous refinement, the first or the second surface of the film has a structure in order to produce a holographic effect. The structure size for producing a holographic effect can be in the range from 0.1 to 1.0 μm. With the proposed implementation, a holographically structured film can therefore be provided with a forgery-proof color marking whose authenticity can be identified by machine.

According to a further configuration feature, the mirror layer can be applied to a carrier film, it being in turn possible for an adhesive layer to be applied to the carrier film, for example by means of a lamination operation. This makes it possible to stick a forgery-proof marking formed in such a way onto an object to be marked.

The adhesive layer is expediently produced from a pressure-sensitive adhesive or a hot-melt adhesive. The adhesive layer is advantageously covered with a protective film that can be pulled off. This makes it easy to affix the forgery-proof marking to an object to be marked.

According to a further refinement, it is also possible for the series of layers applied to the second surface to be present in the form of layered flakes which are accommodated in a transparent matrix. The layered flakes can, for example, float in a regular arrangement in a transparent plastic matrix. They can be applied to the film dispersed in a clear plastic varnish.

The series of layers, for example beginning with the cluster layer, is advantageously applied directly to the surface of the film by means of a coating operation. In such coating operations, it proves to be advantageous if the films can be wound up and guided continuously or semi-continuously through a coating installation. Whereas in the case of discontinuous coating, for example directly on products, high unit prices must be expected, coating processes, such as vacuum coating processes, can be used relatively cost-effectively in the continuous mode. In this case, reflective films are particularly suitable since, if they are used, at least some of the mirror action necessary for producing the characteristic color effect is achieved by the surface to be marked.

If the distance between the film and the cluster layer is less than 2 μm, a coloration forming the marking becomes visible. The thickness of the spacer layer is therefore preferably between 20 and 2000 nm. In the three methods described, it is expediently applied in structured form. The structuring can be a structure in the surface in the manner of a line of text, a pattern, for example a bar code, or a drawing, for example a logo. However, it can also be a relief-like structure. In this case, the marking appears in different colors. The application of thin, preferably polymeric layers with non-vacuum-based methods permits simple production of such a relief-like structured spacer layer.

According to a further configuration feature, an inert protective layer that is transparent to electromagnetic waves is applied to the cluster layer. The protective layer is used for protection against mechanical damage and contamination. However, it also influences the characteristic color spectrum in a defined way and, as a result, increases the complexity of the layer structure and therefore the security against forgery of the marking.

The protective layer can be produced from one of the following material transparent to electromagnetic waves: polymer, metal oxide, metal nitride, metal oxynitride, metal carbide, metal fluoride, in particular from silicon oxide, silicon carbide, silicon nitride, tin oxide, tin nitride, aluminum oxide or aluminum nitride. These materials are substantially chemically inert and insensitive to moisture.

According to a further configuration feature, provision is made for the layers of the series of layers to be produced, at least to some extent, by means of thin layer technology. In this case, in particular PVD, CVD methods and the like are suitable. In addition, it is also possible to deposit the layers of the series of layers from solutions by a wet chemical route. To this extent, reference is made to WO 98/48275, whose disclosure content is hereby incorporated.

According to a further refinement, provision is made to process a film coated with the series of layers to form adhesive or laminating labels. To this end, the film is provided on one of its two sides with an adhesive layer or a double-sided adhesive film or a laminating layer. According to an exemplary application, the layer system produced in this way is then applied to a siliconized substrate with the adhesive layer at the bottom. After that, any desired shapes can be punched or cut from the layer system without affecting the stability of the siliconized substrate. The excess parts can then be removed by stripping, as a result of which the layer system in self-adhesive form or in a form which can be laminated can be applied to different products in an automated form over dispensing edges.

The forgery-proof marking can be used in particular for films for processing in check cards, banknotes, labels for valuable products, for example, or their packages and the like. In this case, a spacer layer with a predefined thickness is applied to a mirror layer joined to the film. Furthermore, a metallic cluster layer is applied to the spacer layer. Such a marking is permanently visible; it is very forgery-proof.

The forgery-proof marking can also have, on a cluster layer joined to the film, a spacer layer applied thereto with a predefined thickness and a mirror layer lying above that. Such a marking is permanently visible through the film; it too is very forgery-proof.

The forgery-proof marking can also have a mirror layer joined to the film and a spacer layer with a predefined thickness. Such a marking is initially invisible. A cluster layer can be applied to a further film as substrate in such a way that, for the purpose of verification or in order to make the marking visible, it can be arranged at a predefined distance from the first layer.

The film to be marked is, for example, produced from a plastic such as polycarbonate, polyurethane, polyethylene, polypropylene, polyacrylate, polyimide, polyvinyl chloride, polyepoxide, polyethylene terephthalate, or from a metal such as aluminum, gold, silver, copper, iron or stainless steel.

If the film to be marked is already produced from a material that reflects electromagnetic waves, for example a metal, or is coated with such a material, the mirror layer can be formed by the film itself.

The film to be marked can be printed before the coating, it being possible for the optical effects of the marking layer system to be influenced in an unexpected way by the interaction with the printing ink. In accordance with the invention, it proves to be an advantageous refinement if the layer that reflects electromagnetic waves and also the cluster layer exhibit less than 50% reflectance over at least some of the visible spectrum.

In general, the use of printing methods can serve to store additional information on the marking surface.

As a result, personalized marking can also be achieved. Such personalization of the marking can also be achieved subsequently by printing the marked surfaces with printing methods that are more widespread such as laser and inkjet printers.

The films to be marked can also be provided with holograms. The marking can advantageously be formed in such a way that all the marking layers together absorb less than 90% of the incident light and thus the hologram structures lying underneath can still easily be detected. Furthermore, the marking described can also be provided directly on or in the vicinity of the embossed surface of holograms, as a result of which the holograms become forgery-proof and machine-readable.

According to the invention, a method is also provided for the machine identification of a forgery-proof marking according to the invention, having the following steps:

a) registration of the spectrum of the light reflected by at the forgery-proof marking at a predefined viewing angle, b) measurement of values for determining (i) the position and/or (ii) the shape and/or (iii) the intensity of one or more absorption peaks characteristic of the marking within a predefined spectral range and c) comparison of the values (i) to (iii) measured in step b with predefined corresponding values and d) identification of the marking by using the result of the comparison.

The measurement of the values for determining the characteristic absorption peaks is carried out in accordance with step b within a predefined spectral range. Here, the spectral range in which the absorption peaks characteristic of the marking are expected is expediently chosen. If no absorption peak occurs in this predefined spectral range, it is possible to omit the further steps for identification. Steps c and d contribute to high identification security.

It has proven to be expedient to register the spectrum at a viewing angle of 5 to 50°, based on the normal to the surface, preferably of 15° to 40°. Particularly pronounced absorption peaks are observed in this range. Furthermore, it is expedient to use the symmetry of the absorption peak as a detection feature for the presence of an absorption peak produced by the cluster layer. Absorption spectra which are produced by cluster layers are partially formed distinctly asymmetrically.

As a further identification feature, the absolute intensity of the absorption peak is measured. This is particularly high as compared with absorption peaks of series of layers produced in accordance with the prior art.

The light shone onto the marking can be produced by means of an incandescent lamp, laser, fluorescent lamp, light-emitting diode or xenon lamp. In this case, the reflected light is particularly well suited to measuring the absorption spectra. In order to increase the security of the identification, the marking can be identified by registering the reflected spectrum at various viewing angles.

In order to further secure the authenticity of the marking, the marking can be identified as such only if the measured values (i) to (iii) lie within a predefined value range around the corresponding values.

Owing to the further configuration features of the method, reference is made to the preceding explanations relating to the forgery-proof marking.

Figure 2:
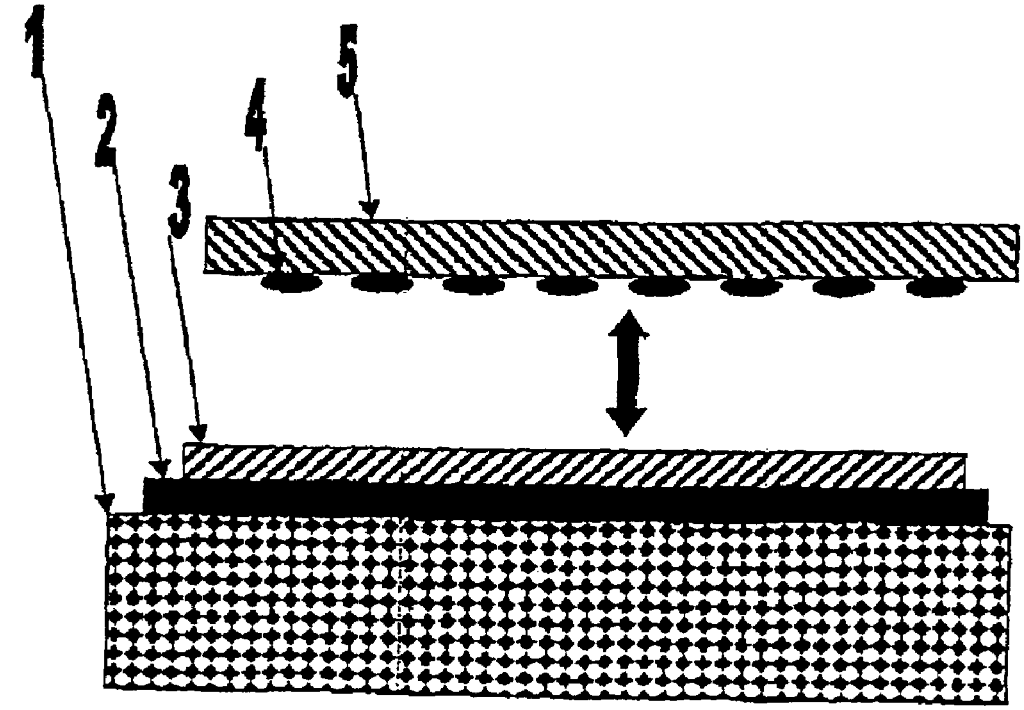
Figure 3:
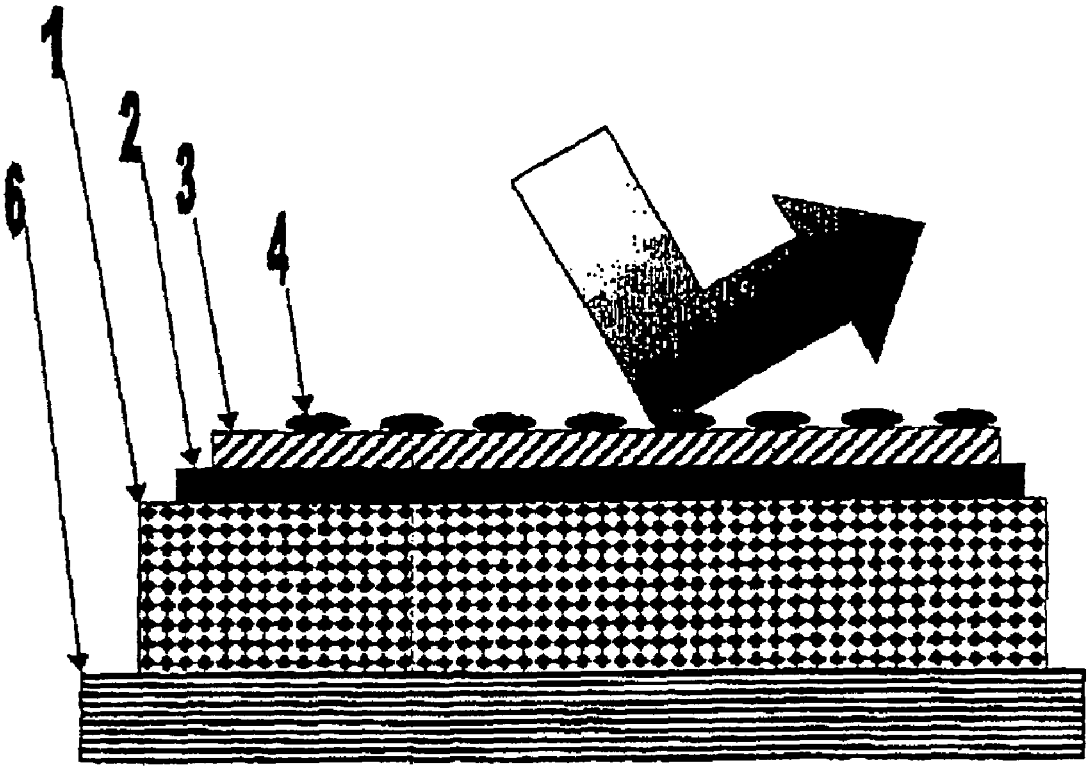
Figure 4:
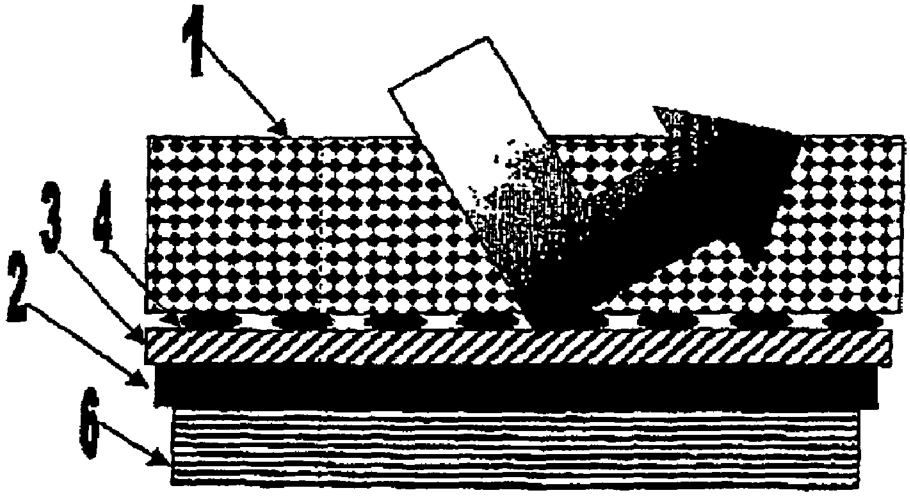
Figure 5:
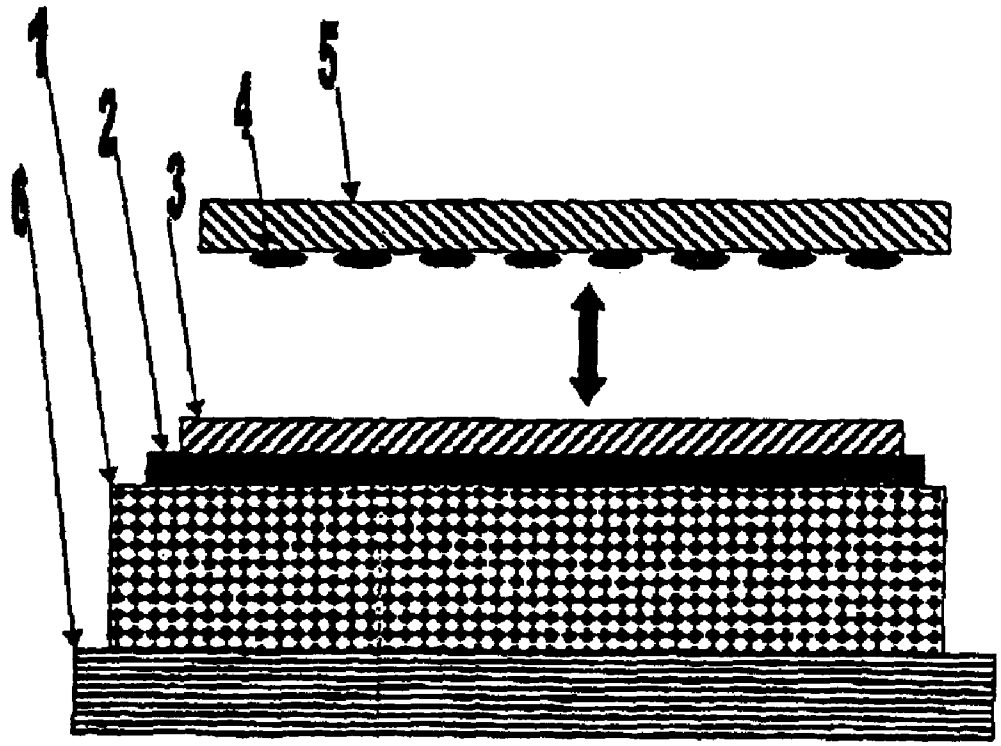
Figure 6A:
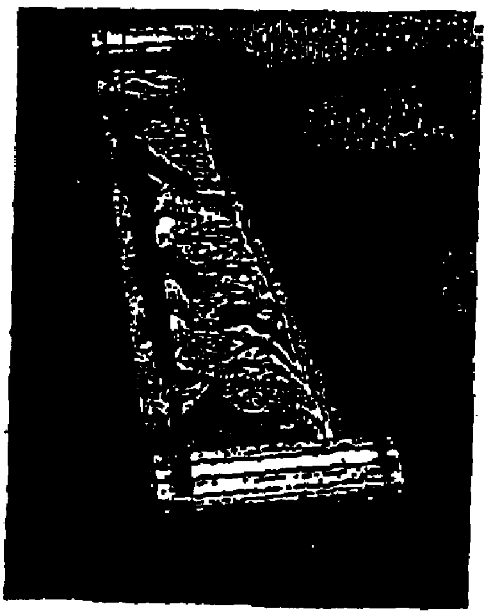
Figure 6B:
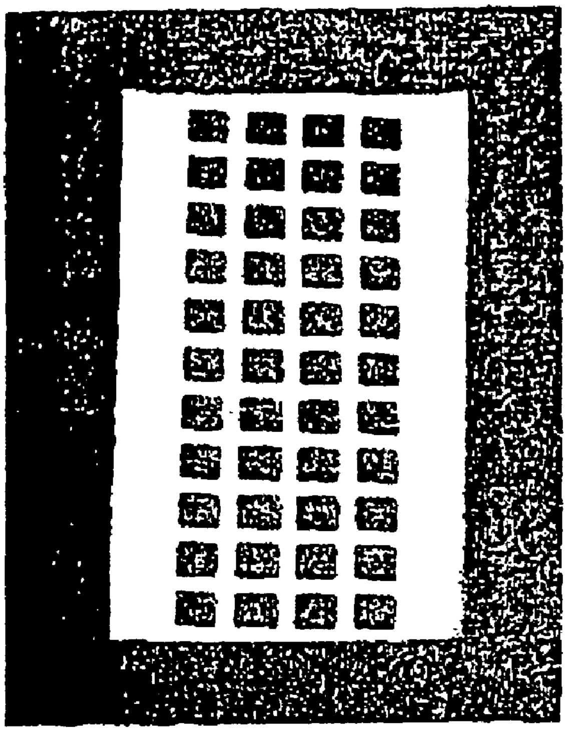
Figure 7:
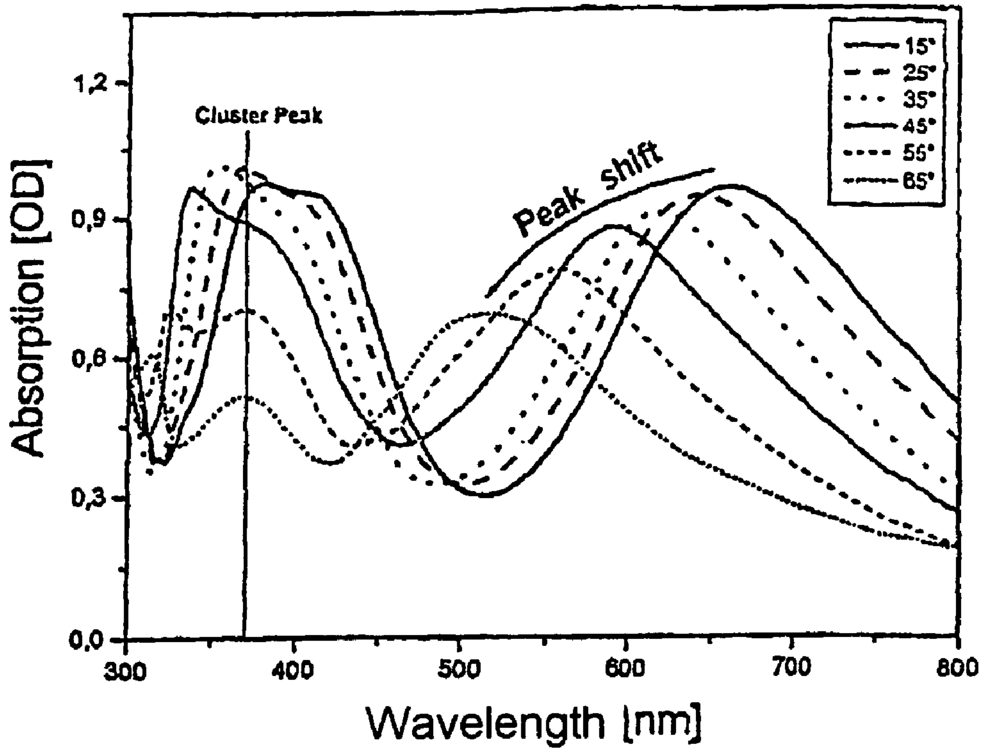
Figure 8:
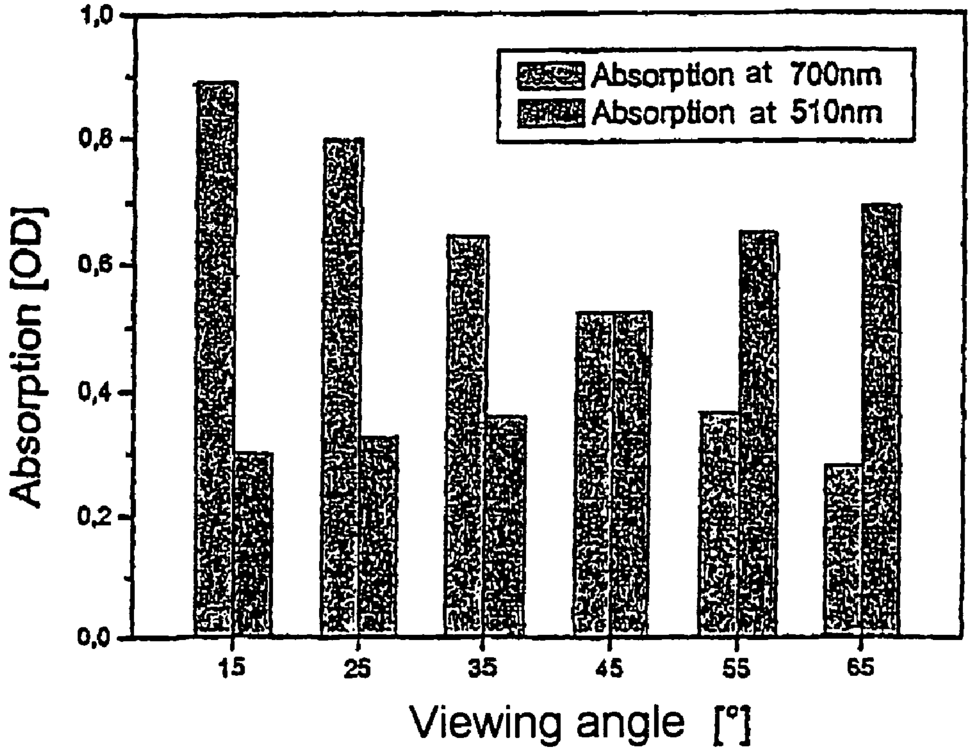
Figure 9:
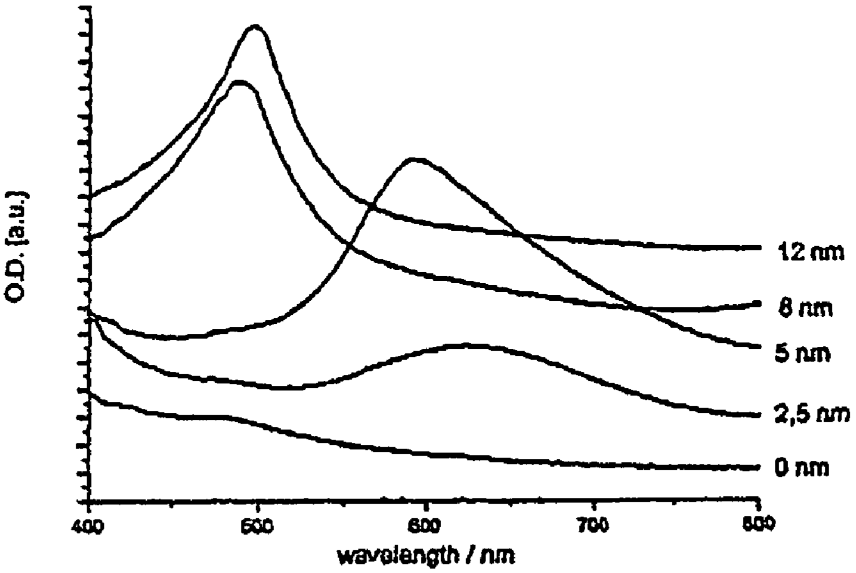
Figure 10:
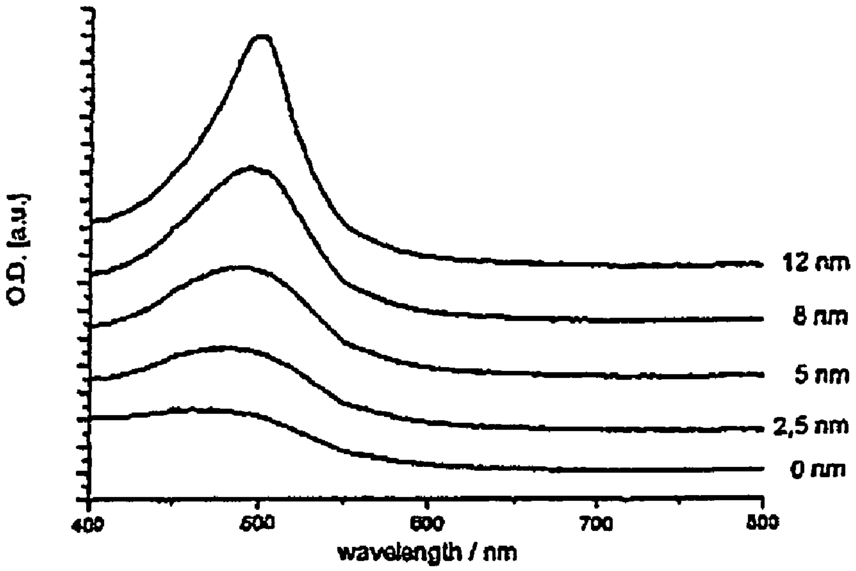

In the following text, exemplary embodiments of the invention will be explained in more detail using the drawings, in which:

FIG. 1 shows a schematic cross-sectional view of a first continuously visible marking, FIG. 2 shows a schematic cross-sectional view of a first marking that is not continuously visible and also a second film suitable for verification or affording visibility, FIG. 3 shows a schematic cross-sectional view of a continuously visible first marking that can be laminated or bonded adhesively, FIG. 4 shows a schematic cross-sectional view of a further continuously visible second marking that can be laminated or bonded adhesively, FIG. 5 shows a schematic cross-sectional view of a first marking that is not continuously visible and can be laminated or bonded adhesively, and also a second film suitable for verification or affording visibility, FIG. 6*a* shows a strip coating with cluster marking, FIG. 6*b* shows adhesive labels produced from strip as in FIG. 6*a*, FIG. 7 shows absorption spectra of a forgery-proof marking at various viewing angles, FIG. 8 shows a quantitative evaluation of the spectra according to FIG. 7 at various wavelengths, FIG. 9 shows measured absorption spectra of forgery-proof marking with metallic cluster layers of different thickness, and FIG. 10 shows calculated absorption spectra of markings with metal layers of different thicknesses.

Figure 11A:
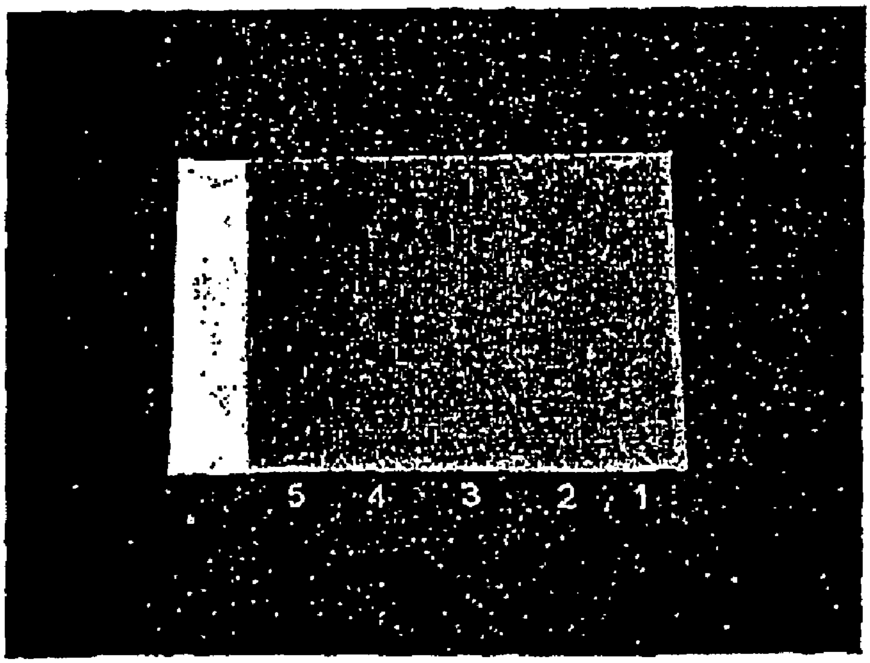

FIG. 11*a* shows five forgery-proof marking applied to an aluminum substrate, which cannot be identified unambiguously by eye.

Figure 11B:
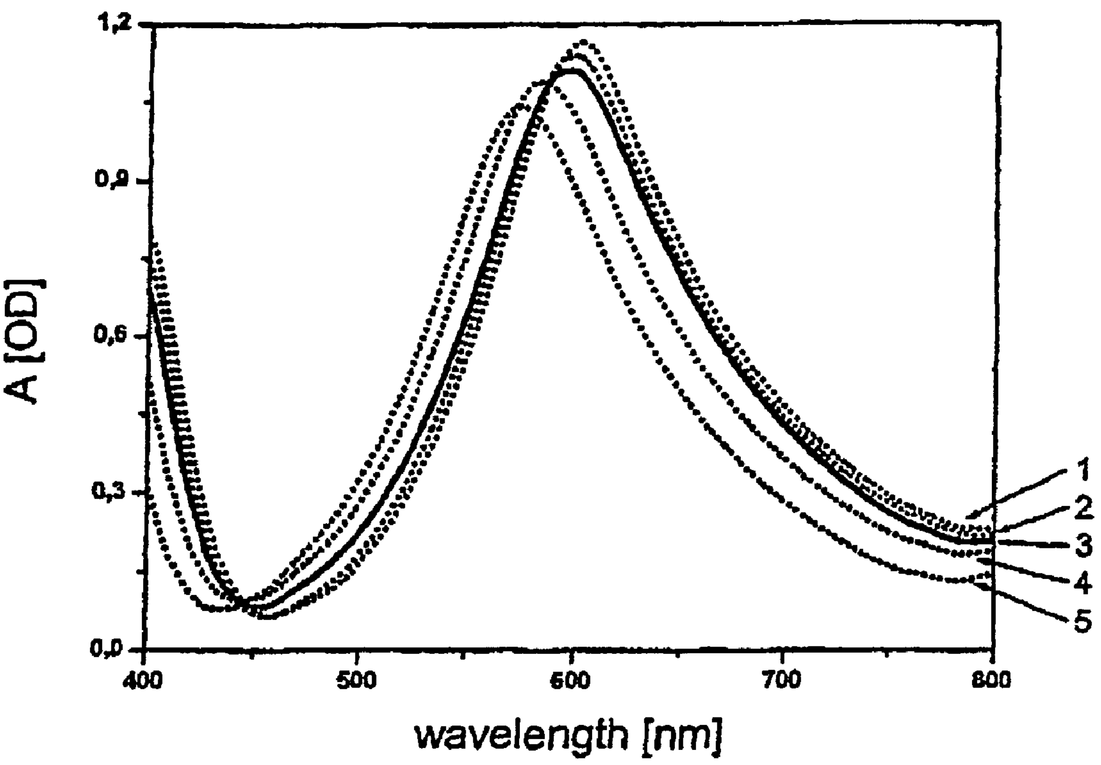

FIG. 11*b* shows measured absorption spectra of the five forgery-proof markings from FIG. 11*a*.

In the markings shown in FIGS. 1 to 5, a mirror layer reflecting electromagnetic waves is designated by the reference symbol 2. This can be a thin layer of aluminum, for example. The mirror layer 2 can, however, also be a layer formed of metallic clusters, which is applied to a film 1. The film 1 can be the film to be marked. An inert spacer layer is designated 3. The cluster layer is designated by the reference symbol 4.

In FIGS. 2 and 5, the second film for making the marking visible is provided with the reference symbol 5.

In FIGS. 3 to 5, the adhesive or laminating layer provided for the further processing of the forgery-proof marked film is designated 6. The change in the reflected light, producing the characteristic color spectrum, as compared with the incident light is visualized in FIGS. 3 & 4 by means of the gray-stepped variation in an arrow.

In the markings shown in FIGS. 1 and 3, the cluster layer 4 is applied to the spacer layer 3. In this case, the spacer layer 3 is applied to the mirror layer 2. Furthermore, in FIGS. 1 and 3, the mirror layer is applied to a film 1.

In FIG. 4, first of all the cluster layer 4, then the spacer layer 3, then the mirror layer 2 and lastly the adhesive or laminating layer 6 are applied to the film 1.

In the markings shown in FIGS. 2 and 5, only the optically transparent spacer layer 3 is applied to the mirror layer 2 and the latter is applied to a film 1. The marking is initially not visible. The markings are only visible when they are brought into contact with the second film 5, to whose surface the cluster layer 4 formed of metallic clusters is applied. A color effect, which can be observed through the transparent film 5, is then in turn produced. The film 5 is expediently produced from a transparent material, for example from plastic such as polycarbonate, polyurethane, polyethylene, polypropylene, polyacrylate, polyvinyl chloride, polyepoxide, polyterephthalate.

The function of the marking is as follows:

When light from a light source, such as an incandescent lamp, laser, a fluorescent tube or a xenon lamp, is shone onto one of the markings shown in FIGS. 1, 3 and 4, this light is reflected at the mirror layer 2. As a result of interaction between the reflected light and the cluster layer 4 formed of metallic clusters, some of the incident light is absorbed. The reflected light has a characteristic spectrum that depends on a number of parameters, such as the optical constants of the layer structure or the shape of the clusters. The marking appears colored. The coloration serves as a forgery-proof verification of the authenticity of the marking. The color impression obtained in this way depends on the angle and can be identified both roughly with the naked eye and exactly with a reading device operating in the reflection mode, preferably a spectrophotometer. Such a reading device can, for example, register the coloration of the marking from two different angles. This is done either by means of a detector by two light sources which are connected up appropriately being used and the detector being tilted appropriately, or by two reading devices measuring the sample, illuminated from two different angles, from the two corresponding angles.

With regard to the parameters to be maintained for the production of the interactions, reference is made to U.S. Pat. No. 5,611,998 and WO 99/47702, whose disclosure content is hereby incorporated.

FIG. 6*a* shows a continuously coated forgery-proof marked film which has partly been wound up on rolls.

FIG. 6*b* illustrates how adhesive labels produced from a film as in FIG. 6*a* were fabricated with the forgery-proof marking.

The spectra shown in FIG. 7 from a forgery-proof marking according to FIG. 1 were measured by means of a Lambda UV/VIS spectrometer from Perkin Elmer, using a reflection insert. FIG. 7 reveals that the longer-wave peak is displaced toward shorter wavelengths as the viewing angle increases. Furthermore, a stationary peak can be observed, which is characteristic of the silver clusters used. At viewing angles of less than 45°, the peaks of this marking have an intensity of about 1 OD, which corresponds to 90% absorption.

FIG. 8 shows a quantitative evaluation of the spectra according to FIG. 7, in each case at two different wavelengths. At the wavelengths considered, a changed absorption is observed as a function of the viewing angle. The absorption pattern is characteristic of the authenticity of the marking.

FIGS. 9 and 10 again illustrate the difference of the cluster layers according to the invention as compared with conventional absorber layers which are formed from a metal layer. The spectra shown in FIG. 9 have been measured on a forgery-proof marking which has a film produced from polyethylene terephthalate with a thickness of 75 μm. A gold layer with a thickness of 100 nm is applied to this film as a mirror layer. The mirror layer is covered with a spacer layer produced from $MgF_2$ with a thickness of 270 nm. The spacer layer is in turn covered by a layer produced from metallic gold clusters with thicknesses in the range from 0 to 12 nm. The aforementioned layers were applied to the film by means of vacuum coating. The measurements were in each case carried out at a viewing angle of 18°.

By comparison, FIG. 10 shows absorption spectra which have been calculated by using the aforementioned parameters for an absorber layer produced from gold.

A comparison of FIGS. 9 and 10 shows that, in this case, in particular cluster layers with a thickness in the range from 2.5 to 5 nm exhibit a characteristic absorption peak displaced toward higher wavelengths. The absorption peak is broadened considerably and, in the case of the 5 nm thick cluster layer, is asymmetrical. At 8 nm cluster thickness, the absorption peak is at the same wavelength as in the calculated spectrum but still considerably higher. At higher thicknesses of the cluster layers, the absorption peaks are similar to the absorption peaks of the calculated spectra. This points to the fact that, for the case illustrated here, starting at a thickness of about 12 nm, the coating density of the clusters is so high that the cluster layers formed behave, at least optically, like continuous metal layers.

The forgery-proof marking proposed by the invention can be identified by machine with high reliability. For this purpose, the marking is irradiated, for example by means of an incandescent lamp. The absorption spectrum of the light reflected from the marking is measured at a viewing angle of, for example, 18°. For this purpose, a spectral range between 500 and 700 nm is advantageously observed. The absolute intensity of an absorption peak possibly occurring there is determined. Furthermore, the spectral position of the maximum is determined. In addition, the symmetry of the absorption peak can be determined by using predefined reference points. The values determined are compared with predefined value ranges which have been determined by using standards, for the purpose of identification of the marking.

In order to increase the identification security, the aforementioned measurement can be carried out at different viewing angles.

FIG. 11*a* shows a five-stripe sample (gold clusters on aluminum oxide spacer layer on aluminum mirror) to demonstrate the resolution of machine evaluation. At about 45°, all five stripes appear blueish. The difference between the stripes is itself barely or not visible to the eye in the gray-step mode.

FIG. 11*b* shows the measured spectra of the five stripes from FIG. 11*a*, which were measured with a hand-held two-channel spectrometer. Stripes 1, 2, 4 and 5 are detected as forgeries during the software-assisted evaluation of the data from the two-channel spectrometer if the data from stripe 3 is stored as original.

LIST OF REFERENCE SYMBOLS

1 Film
2 Mirror layer
3 Spacer layer
4 Cluster layer
5 Second film
6 Adhesive layer

The invention claimed is:

1. A method for the machine identification of a forgery-proof marking for an object, said forgery-proof marking comprising (a) a transparent film produced from plastic and having a first and second surface, (b) wherein said second surface comprises a series of layers whose color changes as a function of the viewing angle, wherein the series of layers is formed from an absorber layer, a spacer layer overlying the absorber layer and a mirror layer overlying the spacer layer, wherein the absorber layer comprises metallic clusters, said method having the following steps:

a) registering a spectrum of light reflected by the forgery-proof marking at a predefined viewing angle,
b) measuring values for determining (i) a position and/or (ii) a shape and/or (iii) an intensity of one or more absorption peaks characteristic of the marking within a predefined spectral range,
c) comparing the values (i) to (iii) measured in step b) with predefined corresponding values, and
d) identifying the marking by using results of the comparison.

2. The method as claimed in claim 1, the spectrum being registered at a viewing angle of 5° to 50°.

3. The method as claimed in claim 2, the spectrum being registered at a viewing angle of 15° to 40°.

4. The method as claimed in claim 1, the absorption peak being used as a detection feature for the presence of an absorption spectrum produced by the cluster layer (4).

5. The method as claimed in claim 1, the absolute intensity of the absorption peaks being measured.

6. The method as claimed in claim 1, the marking being identified as such only if the measured values (i) to (iii) lie within a predefined value range around the corresponding values.

7. The method as claimed in claim 1, the light being produced by means of an incandescent lamp, laser, fluorescent lamp, light-emitting diode or xenon lamp.

8. The method as claimed in claim 1, the marking being identified by registering the reflected spectrum at various viewing angles.

* * * * *